(12) United States Patent
Chenel

(10) Patent No.: US 7,744,329 B2
(45) Date of Patent: Jun. 29, 2010

(54) AUTOMATIC RELEASE SYSTEM

(75) Inventor: Joseph Michel Donald Chenel, Fredericton (CA)

(73) Assignee: Her Majesty the Queen in Right of Canada, as represented by the Solicitor General of Canada, Ottawa (CA)

( * ) Notice: Subject to any disclaimer, the term of this patent is extended or adjusted under 35 U.S.C. 154(b) by 1000 days.

(21) Appl. No.: 11/365,692

(22) Filed: Mar. 2, 2006

(65) Prior Publication Data

US 2009/0116946 A1 May 7, 2009

Related U.S. Application Data

(60) Provisional application No. 60/657,430, filed on Mar. 2, 2005.

(51) Int. Cl.
*B65G 67/24* (2006.01)
(52) U.S. Cl. .................. 414/377; 414/380; 294/75; 212/117; 24/131 C; 292/201
(58) Field of Classification Search ............... 187/349; 294/75, 76, 254, 74; 414/377, 729, 380; 292/195, 201; 102/202.5; 89/41.05; 212/117–121; 24/598.7, 601.8, 131 C, 134 L; 43/57.3, 43/17.2, 27.2, 27.4; 16/208
See application file for complete search history.

(56) References Cited

U.S. PATENT DOCUMENTS

| 845,693 | A | * | 2/1907 | Coats et al. ............... 294/82.33 |
| 1,484,775 | A | * | 2/1924 | Haight .................... 244/155 R |
| 3,383,721 | A | * | 5/1968 | Adams, Jr. .................. 114/365 |
| 4,077,660 | A | * | 3/1978 | Phillips ....................... 294/75 |
| 4,417,758 | A | * | 11/1983 | Vaders ..................... 294/82.14 |
| 4,621,562 | A | * | 11/1986 | Carr et al. .................. 89/41.05 |
| 6,024,394 | A | * | 2/2000 | Marler ........................ 294/75 |
| 6,422,614 | B1 | * | 7/2002 | Kuntz et al. ................. 292/144 |

\* cited by examiner

*Primary Examiner*—Saúl J Rodríguez
*Assistant Examiner*—Jonathan D Snelting
(74) *Attorney, Agent, or Firm*—Jones, Tullar & Cooper, PC

(57) ABSTRACT

A release mechanism for use with an explosives disposal robot having an elongated boom includes a latch member secured to an outer end of the boom, the latch member having a fixed portion and movable latch or lever members. A flexible strap extends between the lever members, with one end being attached to one of the lever members and the other end being releasably attached to the other lever member. When the other lever member is moved to a release position the other end of the strap falls from the other lever member so as to release, for example, a firing line cradled in the strap. The one lever member can be actuated by way of a remote controlled solenoid connected thereto via a flexible cable or by way of an elastic member connected thereto. The elastic member is particularly useful when the elongated boom is telescopic in nature, as the latch member will be secured to one of the boom members and one end of the elastic member will be connected to another of the boom members with the other end of the elastic member being connected to the one lever member. When there is telescopic extension movement between the boom members the elastic member will act on the one lever member to cause it to move so as to release the strap from the other lever member.

4 Claims, 5 Drawing Sheets

AUTOMATIC RELEASE SYSTEM

This invention relates to an automatic release system particularly useful for the release of one or more firing lines from an explosives disposal robot during the placement of appropriate counter charges.

BACKGROUND OF THE INVENTION

Explosives disposal robots are well known to police forces and the military and are utilized around the world for dealing with bombs and other hazardous items at a distance from the operators thereof. Typical of such robots is an extensible boom arrangement with controllable grasping means at the outermost end thereof. The extensible boom allows the robot to carry and deliver explosives counter charges to Improvised Explosive Devices.

When a robot is being used to counteract a suspected explosives device it will be moved into a position spaced from it following the placement of a counter charge adjacent the alleged device. The counter charge would typically be suspended from the free end of the extensible boom, deposited and released from the boom at the appropriate time. The explosive counter charge would typically include a detonator and a firing line. The firing line extends from the detonator to the initiation mechanism of the robot, safely positioned away from the suspect device. The firing line is used to send an electrical pulse to fire electric detonators or a shock wave when using non-electric detonators to effect detonation.

It is important during the delivery phase of the operation that there be a certain degree of slack associated with the firing line. The slack is typically maintained by looping the line through a cradle formed from a length of adhesive tape applied to telescoping portions of the extensible boom. When the counter charge is properly positioned and the robot is withdrawing from the danger zone, the boom is extended further so as to stretch the tape and thus permit it to become detached from one or both of the telescoping boom portions. When the tape becomes detached, the firing line should fall to the ground and then the robot can withdraw fully from the firing line without fear of accidentally stretching the firing line and upsetting the counter charge.

Unfortunately, the operation as described above does not always work in the desired manner. In some instances the firing line remains adhered to the tape even after one end of the tape has disengaged from the respective boom portion and withdrawal of the robot could cause the line to stretch and cause it to be moved away from the suspect device. This can considerably frustrate the officers who are charged with dealing with the suspect device in the safest manner possible, since it may mean that an officer will have to approach the suspect device in order to reposition the counter charge.

SUMMARY OF THE INVENTION

The present invention provides a release mechanism which can be easily attached to the boom of an explosives disposal robot, or any other similar device having an extensible or a non-extensible boom, and which will provide the desired cradle for receipt of a firing line, thereby ensuring the required slack in the line during deliver of the firing line. When the telescoping portions of the boom are extended relative to each other the mechanism will exert a pulling force on an elastic member of the mechanism, causing that member to unlatch a latch element which previously was retaining one end of a strap which defines the cradle through which the firing line has been looped. The released end of the strap will fall towards the ground, thereby allowing the looped firing line to disengage itself from the strap. There is no danger of the firing line being held by the strap after release and the robot can always safely withdraw from the danger zone without the possibility of pulling the firing line along with it.

In one aspect thereof the present invention may be considered as providing a release mechanism for use with apparatus including a first member that is extensible with respect to a second member. An elongated elastic member is connected at one end thereof to the second member. A latch member is connected to the first member for movement therewith, the latch member including a fixed portion and a latching portion movable between latching and release positions. First means connect the other end of the elastic member to the latching portion of the latch member. An elongated strap member is connected at one end thereof to the other end of the elastic member and the other end of the strap member is releasably connected by way of second means to the latching portion of the latch member. The second means is retained at the latch member by the latching portion in the latching position thereof when the first and second members are in a non-extended relation. Extending movement of the first member relative to the second member will create a force acting on the latching portion through the elastic member so as to move the latching portion from its latching position to its release position to thus release the second means from the latch member. When that takes place, the firing line, or anything else being carried in the cradle defined by the elongated strap member will fall therefrom towards the ground.

In another aspect thereof the present invention may be considered as providing a release mechanism for use with apparatus including an elongated boom member. A latch member is connected to the elongated member towards the outer end thereof, the latch member including a fixed portion and first and second latching portions each movable between latching and release positions. An elongated strap member is connected at one end thereof to the first latching portion and the other end of the strap member is releasably connected to the second latching portion. The other end of the strap member is retained at the latch member by the second latching portion in the latching position thereof. A remotely operable actuator is secured to the elongated boom member and is connected to the first latching portion. When operated, the actuator will create a force acting on the first latching portion so as to move the second latching portion from its latching position to its release position to thus release the other end of the strap member from the second latching portion. When that takes place, the firing line, or anything else being carried in the cradle defined by the elongated strap member will fall therefrom towards the ground.

DESCRIPTION OF THE PREFERRED EMBODIMENT

Figure 1:
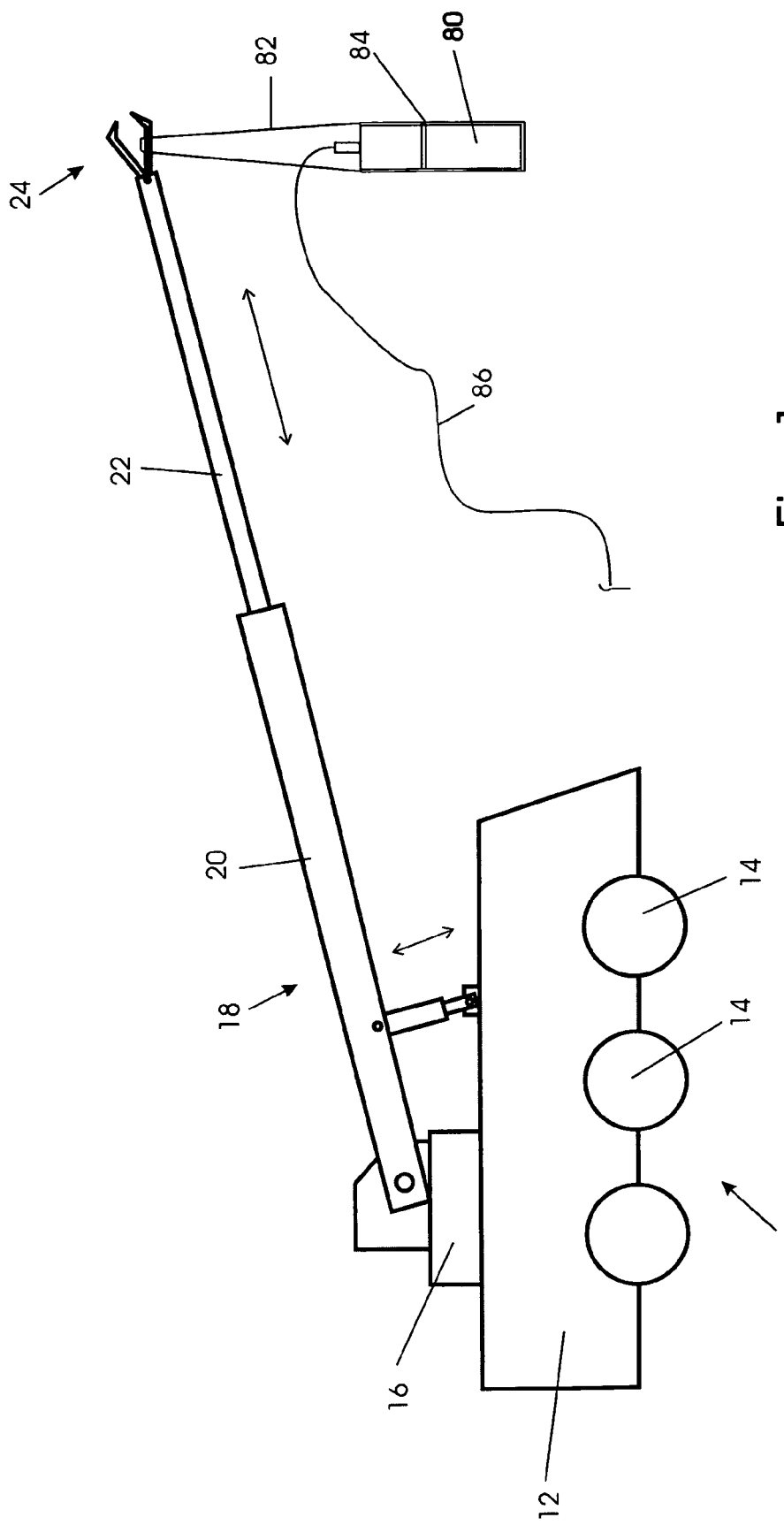
FIG. 1 is a schematic representation of an explosives disposal robot with a counter charge suspended at the free end of the boom thereof.

FIG. 1 illustrates in schematic form an explosives disposal robot 10 which typically includes a housing 12, a set of drive wheels 14, a turntable 16 on top of the housing 12, and a boom 18 mounted to the turntable 16 for rotation therewith. The boom 18 is also mounted for vertical pivotal movement on the turntable. The boom 18 is constructed of a plurality of relatively telescoping portions 20, 22 and carries at the free end thereof, in the illustrated version, grasping claws 24. It should be understood that the robot 10 is intended to illustrate typical components and that many other components would be included in a production robot, including other items that can be connected to the boom along with or in place of the grasping jaws 24. Also, while the robot 10 is shown as having two telescoping portions constituting the boom 18, this type of robot is not limited to the number of telescoping portions, as long as there are at least two such portions. A version of the present invention for use with a robot having a non-extensible, or fixed length, boom is described hereinbelow. The motive means for driving the driving wheels 14 and the electric, pneumatic or hydraulic means for moving the turntable and for causing telescoping movement of the boom portions are conventional and are not shown.

Figure 2:
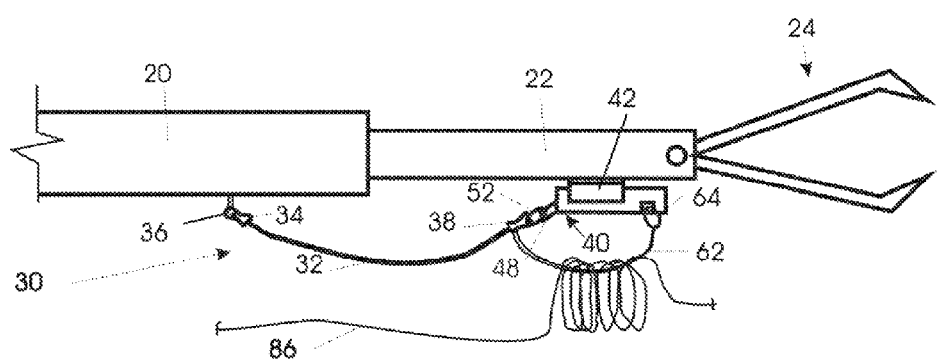
FIG. 2 is a schematic representation showing the release mechanism of the invention in a latched condition.
Figure 3:
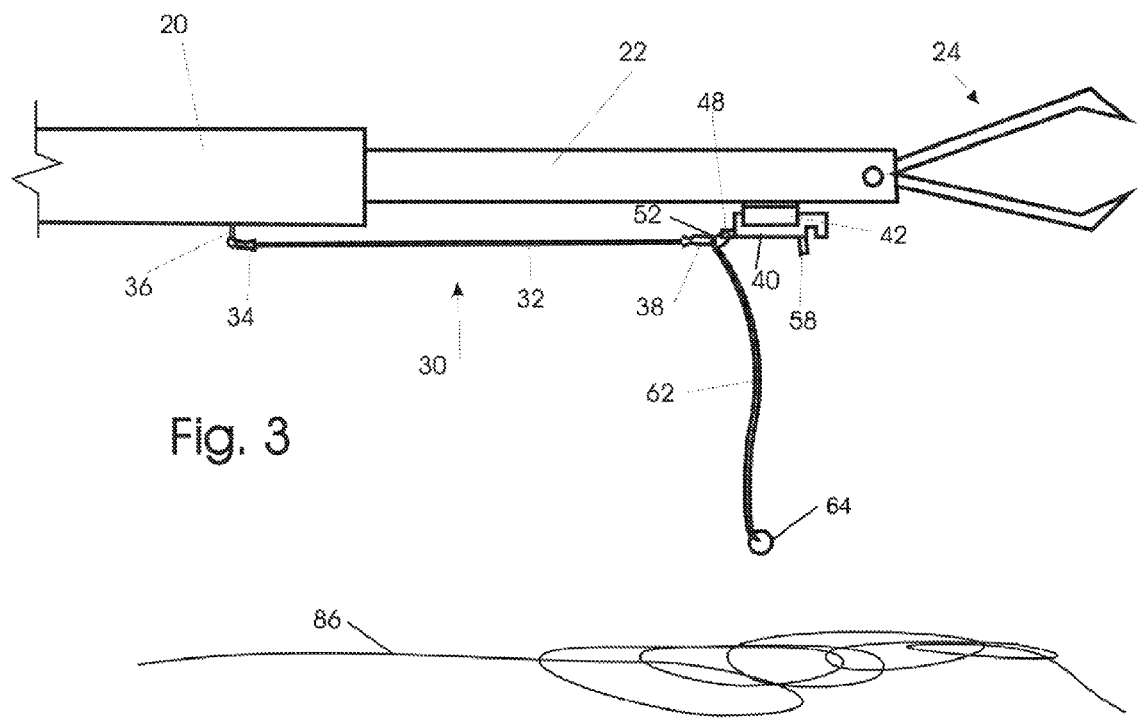
FIG. 3 is a view similar to FIG. 2 showing the release mechanism of the invention after the operation thereof.
Figure 4:
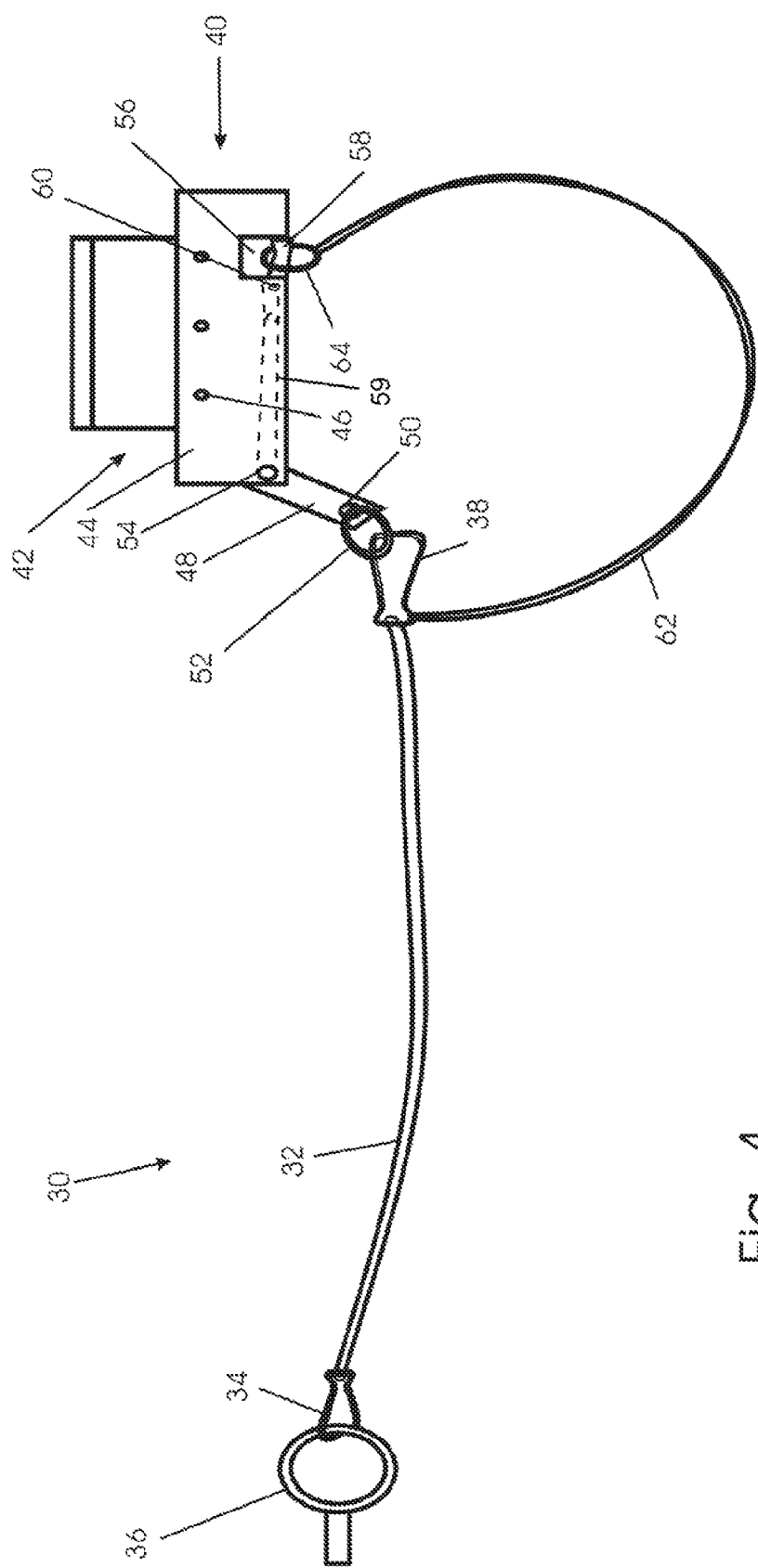
FIG. 4 is a representation of the release mechanism of the invention fully detached from a robot.

Referring to FIGS. 2 to 4 the release mechanism of the present invention is shown generally by the reference number 30. It includes an elongated elastic member 32 such as a "bungee cord", one end of which is connected to a snap hook 34. That hook is, in turn releasably connected to an eye 36 which is fixed to one of the telescoping portions, such as portion 20, of the boom 18. The other end of the elastic member 32 is connected to a second snap hook 38.

A latch member 40 is fixed to a bracket 42 which in turn is fixed to another of the telescoping portions of the boom 18. The bracket will, in actuality, be connected to the telescoping portion 22 which is movable relative to the boom portion 20 to which the eye 36 is fixed. Thus, during operation of the extensible boom 18 the distance between the eye 36 and the bracket 42 will increase or decrease between positions dictated by the allowable movement of boom portion 22 relative to boom portion 20.

Figure 5:
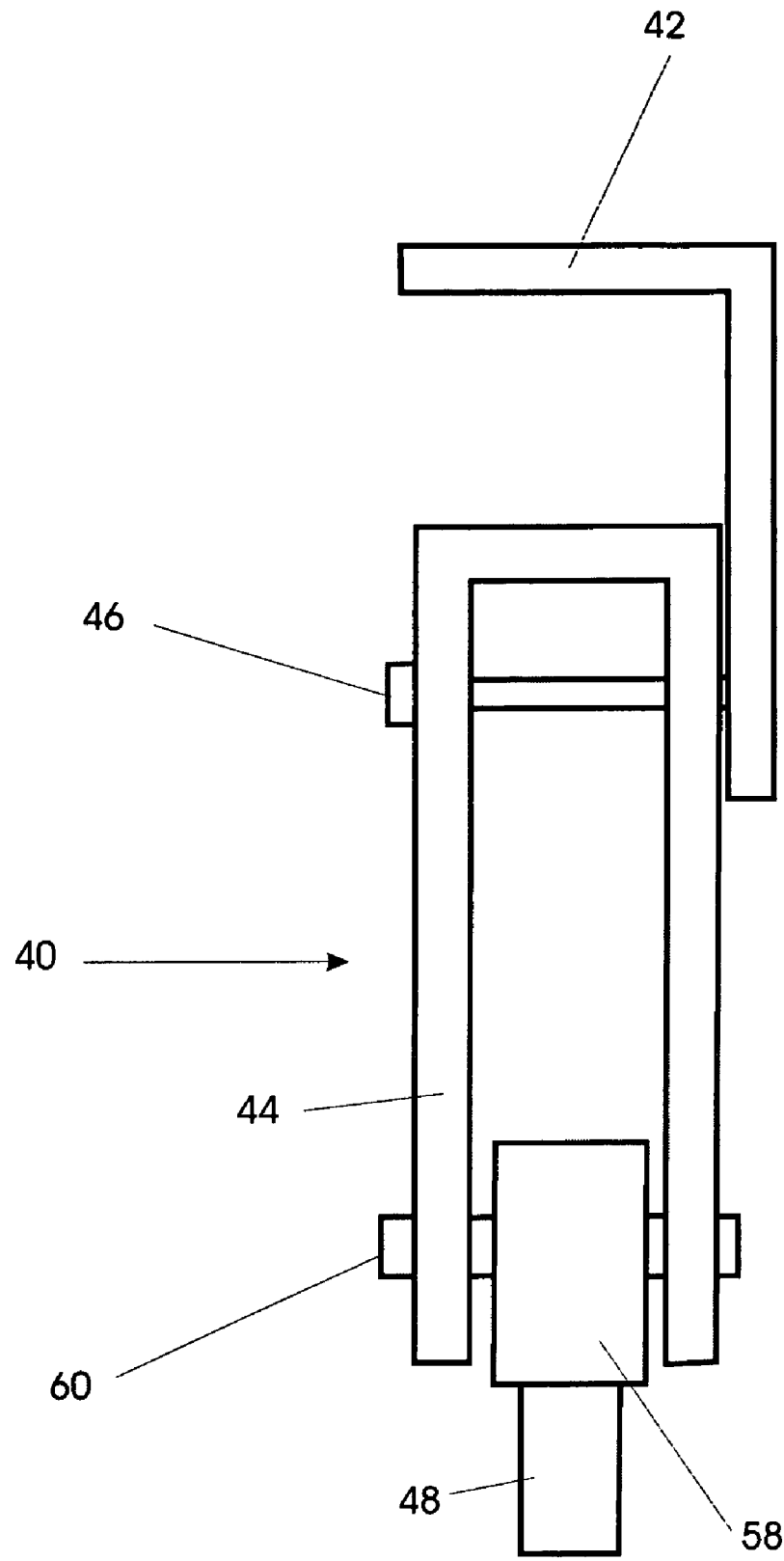
FIG. 5 shows an end view of the latch member of the invention.

The latch member 40 is a commercially available "slam latch", such as a model 240/241 Mini Rotary™ latch produced by Eberhard and the latch member is shown schematically, rather than in detail, in the drawings for the sake of simplicity. The latch member 40 comprises a fixed portion in the form of a generally inverted U-shaped housing 44 which is connected to the bracket 42 via machine screws 46 (FIG. 5). Within the housing 44 there are movable components and springs which are arranged to achieve latching and release. A first pivotable lever member 48 projects from a rear section of the housing, has a through hole 50, and a ring member 52 is loosely attached thereto. The snap hook 38 is connected to the ring member 52. The first latch member can pivot about pivot pin 54.

At the other end of the housing there is an inverted U-shaped cut-out 56. A second pivotable lever member 58 projects into the cut-out 54 to open or close the cut-out. Movement of the first lever member 48 from one position to another will, through the internal components 59 of the latch member, open the cut-out 56 as will be described hereinafter. The second lever member is pivotable about the pivot pin 60.

An elongated strap member 62 that is flexible and smooth is provided, with one end thereof being connected to the snap hook 38. The other end of the strap member 62 is secured to a ring member 64 that is adapted for reception within the cut-out 56 of the latch member 40.

The operation of the release mechanism of the present invention will be described with particular reference to FIGS. 2 to 4. With the telescoping portions 20 and 22 of the boom 18 in the retracted orientation as seen in FIG. 2 the ring member 64 is held within the cut-out 56 by the second lever member 58 which extends across the bottom opening of the cut-out (see also FIG. 4). In this configuration the flexible elastic member 32 and the elongated strap 62 will assume downwardly hanging or extending positions as shown, each creating a loop or cradle effect. As best seen in Prior Art FIG. 1, the boom 18 will be supporting counter charges 80 by way of a carry strap 82 and a holder 84. A flexible, elongated, firing line 86 is shown in FIG. 1 as being connected at one end thereof to the counter charges 80, as hanging from the counter charges, and as extending rearwardly past the robot 10. With the present invention the firing line will be first of all looped over the cradle defined by the elongated strap 62 (FIG. 2), with a substantial degree of slack therein, and it will then be extended rearwardly past the robot 10 to an individual (not shown) who will cause the counter charges to explode at the desired instant by way of the firing line 86.

Once the counter charges 80 have been positioned as desired, the robot can be reversed away from the counter charges, but with the boom sections 20, 22 telescoping relative to each other so as to maintain the grasping end of the boom positioned over the counter charges. The telescoping movement of the boom portions relative to each other has the effect of stretching the elastic member 32 due to the increase in separation between the eye 36 and the bracket 42. When the elastic member 32 becomes taut it will apply a pulling force to the first lever member 48 of the latch member 40, causing the first lever member to pivot upwardly on the mounting or pivot pin 54. This pivoting movement applies a force to the internal components 59 of the latch member 40 which will, in turn, cause pivoting movement of the second lever member 58 downwardly, away from the cut-out 56. Such movement releases the ring member 64 from its latched position within the cut-out 56. The ring member 64 will fall freely under its own weight towards the ground, thereby permitting the firing line which was looped over the elongated strap to fall away from the strap and to thereafter lie upon the ground. The robot is then operated to lower the counter charges to the ground, thereafter releasing them from the grasping jaws 24. The robot is now free to withdraw from the danger area, leaving the counter charges 80 and the firing line 86 behind. Withdrawal of the robot from the danger area will not affect the released firing line or the counter charges and the operator will then be free to detonate the counter charges at will following withdrawal of the robot to safety.

While the operation as described above requires the robot to withdraw while effecting telescoping action of the boom portions 20, 22 it is clear that the robot could be held stationary at a location spaced from the suspect device and that the counter charges could then be moved towards the suspect device using the telescoping action of the boom 18. As the free end of the boom 18 approaches the suspect device the extending movement of the outer boom portion 22 relative to the inner boom portion 20 would effect operation of the release mechanism of the invention, allowing the firing line to fall to the ground during placement of the counter charges at the desired location. In either case, once the counter charges have been properly positioned and the firing line has been released, the operator may raise the boom 18 towards a more vertical orientation to ensure that the strap member 62 and/or the ring member 64 will not snag the firing line and cause problems therewith.

Figure 6:
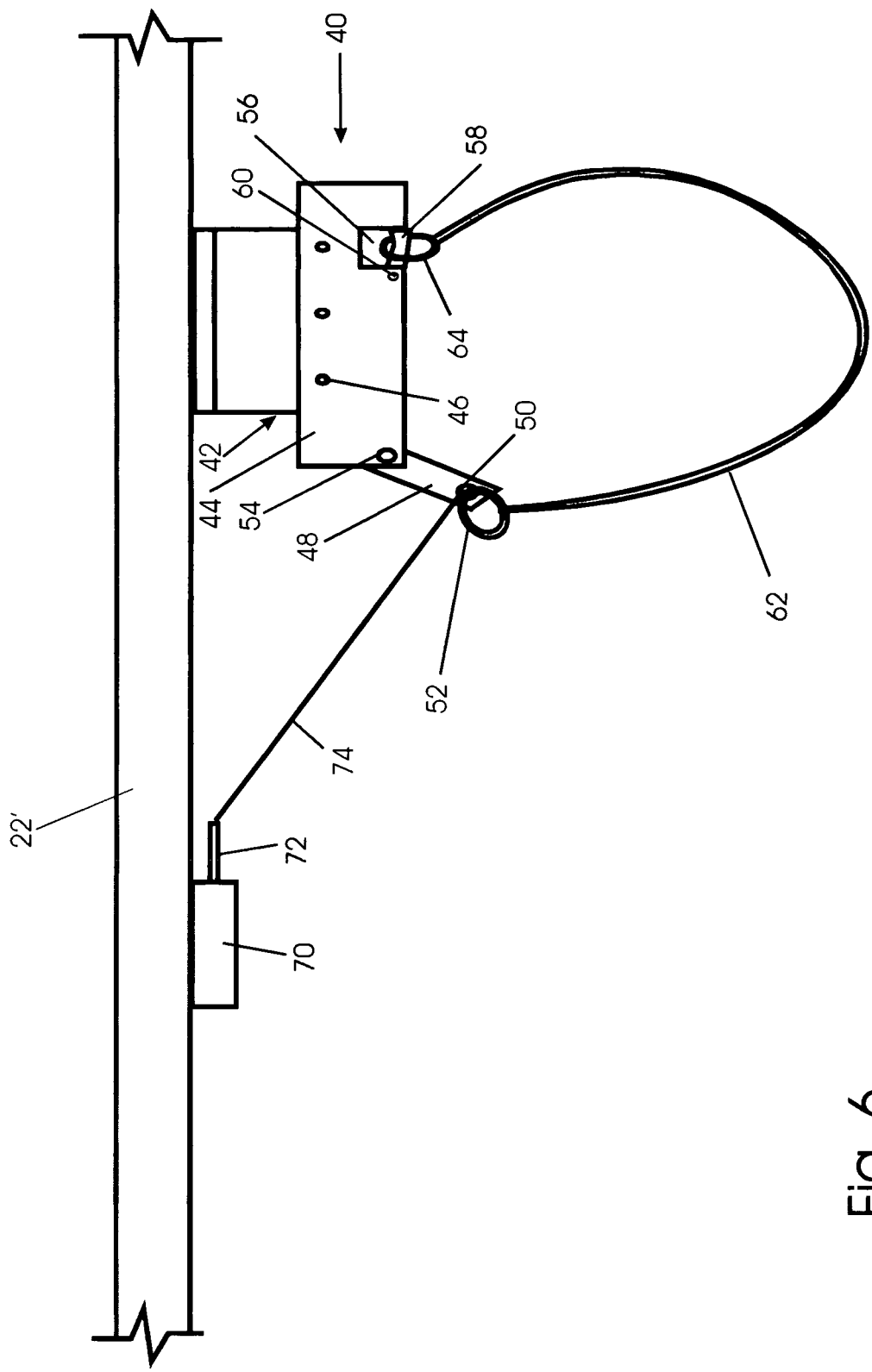
FIG. 6 shows a second embodiment of the present invention.

In an alternative embodiment it would be possible to eliminate the elastic member 32 if the latch member 40 is electrically, pneumatically or hydraulically actuable. The ends of the strap 62 would be secured to the latch member 40 as with the embodiment just described, but the lever member 58 would be operated by remote control so as to release the ring member 64 to permit the firing line to drop from the strap 62 as described above. Such a configuration would be especially useful with a robot that does not have an extensible boom, or one being used with the extensible boom at a fixed length. For example, and with reference to FIG. 6, an electrically operated pull-type solenoid 70 is secured to the boom 22' in a suitable manner. The plunger 72 of the solenoid is connected via metallic wire 74 to the hole 50 in the first lever member 48 or to the ring 52, to which the one end of strap member is connected. When the solenoid is energized electrically, and preferably by remote control, the retracting plunger 72 will pull the lever member 48 to its release position via wire 74, releasing the other end of the strap member 62 from the second lever member 58. As with the embodiment previously described this will permit the firing line to fall from the strap member 62 so that the robot can withdraw after depositing its counter charge.

The present invention was developed for use with an explosives disposal robot but it is clear that the invention would have application to other situations wherein release of an object following the deposit thereof at a specific location is required. Thus the scope of protection to be afforded the present invention is to be ascertained from the claims appended hereto.

The invention claimed is:

1. An explosive disposal robot comprising:
   motive means for moving said robot along a desired route;
   manipulator means mounted to said robot for performing one or more desired tasks, said manipulator means including at least an elongated boom member having a free outer end thereof by which one or more explosive charges are carried;
   a firing line connected to each of said explosive charges; and
   a release mechanism for use in positioning said firing lines, comprising:
   a latch member for connection to said elongated boom member adjacent the free outer end thereof, said latch member including a fixed portion and first and second latching portions, each of said first and second latching portions being movable between latching and release positions;
   an elongated strap member connected at one end thereof to said first latching portion of said latch member;
   means for releasably connecting the other end of said strap member to said second latching portion of said latch member;
   wherein said means for releasably connecting is normally retained at said latch member by said latching portions being in the latching position thereof; and
   wherein a length of each of said firing lines is disposed about the strap member when said other end of said strap is connected to said second latching portion;
   actuator means secured to said boom member; and
   connection means connecting said actuator means to said first latching portion;
   wherein operation of said actuator means moves said first and second latching portions to their release position to thus release said other end of said strap member from said second latching portion and to thereby release said length of each of said firing lines disposed on said strap member.

2. The explosives disposal robot of claim 1 wherein said actuator means comprises an electrically operable solenoid having a retractable plunger therein and said connection means comprises a flexible cable connecting said plunger to said first latching portion of said latch member.

3. The explosives disposal robot of claim 2 wherein: said fixed portion of said latch member includes a generally U-shaped housing affixed to said elongated boom member; said first latching portion of said latch member includes a first lever member pivotally mounted to said housing and being connected with said flexible cable; said second latching portion includes a second lever member co-operating with said housing for retention of said other end of said strap member in said latching position; and means connected between said first lever member and said second lever member for moving said second lever member to the release position thereof.

4. The explosives disposal robot of claim 3 including a ring member secured to said other end of said strap member for retention between said second lever member and said housing of said latch member.

* * * * *